United States Patent
Ihara et al.

(10) Patent No.: US 6,188,713 B1
(45) Date of Patent: Feb. 13, 2001

(54) SOLID-STATE LASER APPARATUS

(75) Inventors: Masahiro Ihara, Kyoto; Naoji Moriya, Nara, both of (JP)

(73) Assignee: Shimadzu Corporation (JP)

( * ) Notice: Under 35 U.S.C. 154(b), the term of this patent shall be extended for 0 days.

(21) Appl. No.: 09/327,887

(22) Filed: Jun. 8, 1999

(30) Foreign Application Priority Data

Jun. 24, 1998 (JP) .................................................. 10-177457

(51) Int. Cl.[7] ...................................................... H01S 3/08
(52) U.S. Cl. .............................. 372/101; 372/98; 372/75; 372/19; 372/108; 372/39
(58) Field of Search ........................... 372/9, 18, 19, 372/39, 40, 43, 71, 72, 75, 92, 101, 108, 98

(56) References Cited

U.S. PATENT DOCUMENTS

| | | | |
|---|---|---|---|
| 4,426,707 * | 1/1984 | Martin et al. ..................... | 372/101 X |
| 4,564,268 * | 1/1986 | Tatsuno et al. ................... | 372/101 X |
| 4,779,278 * | 10/1988 | McKinney .......................... | 372/19 |
| 4,942,586 * | 7/1990 | Lai .................................. | 372/68 |
| 5,140,608 * | 8/1992 | Karpol et al. ..................... | 372/101 |
| 5,268,920 * | 12/1993 | Esterowitz et al. ............... | 372/101 X |
| 5,278,851 * | 1/1994 | Goto ................................ | 372/19 |
| 5,349,600 * | 9/1994 | Shinbori et al. .................. | 372/92 |
| 5,349,603 * | 9/1994 | Kaneda et al. .................... | 372/101 |
| 5,651,020 * | 7/1997 | Nighan, Jr. et al. ............... | 372/92 |
| 5,692,005 * | 11/1997 | Maag et al. ....................... | 372/70 |
| 5,982,806 * | 11/1999 | Yamaguchi et al. ............... | 372/103 |
| 6,061,382 * | 5/2000 | Govorkov et al. ................. | 372/101 |

* cited by examiner

*Primary Examiner*—Brian Healy
(74) *Attorney, Agent, or Firm*—Coudert Brothers

(57) ABSTRACT

Abstract of the Disclosure A solid-state laser apparatus has a solid-state laser medium inside a resonator. A pump light source such as a semiconductor laser apparatus generates pump light, and an optical system focuses the pump light on the solid-stated laser medium such that its distribution is not only inside but also at least in part outside the resonator mode in the solid-state laser medium, say, over more than 50% of the total length of the solid-state laser medium.

8 Claims, 2 Drawing Sheets

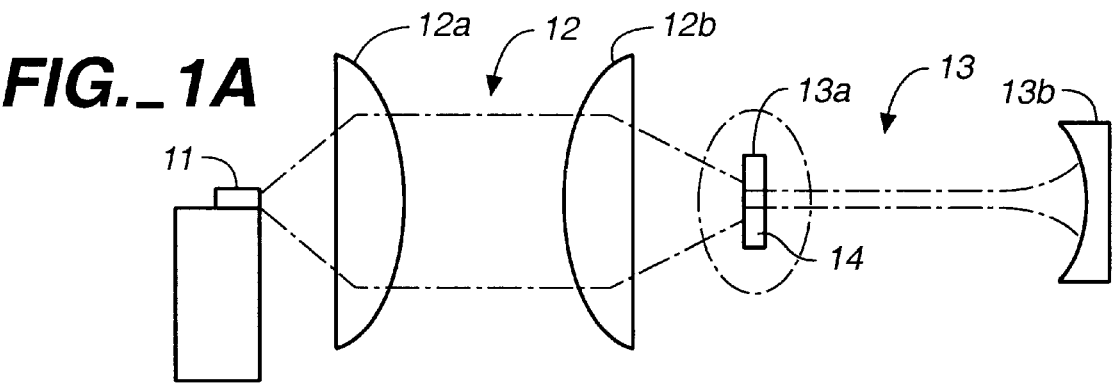
FIG._1A
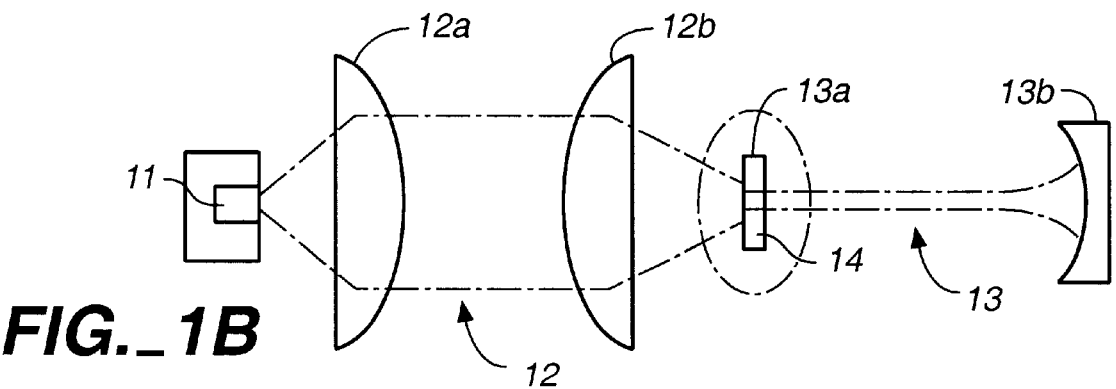
FIG._1B
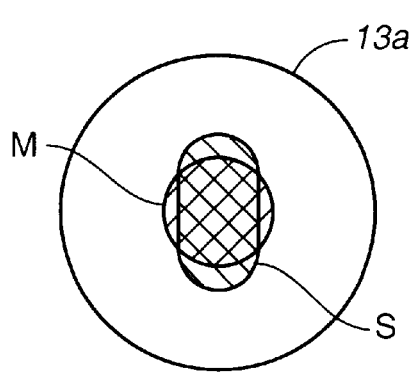
FIG._2A
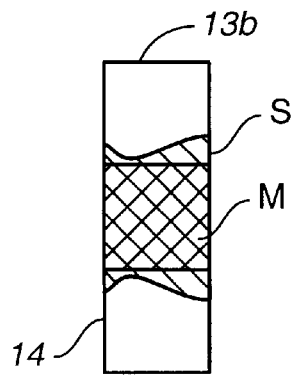
FIG._2B

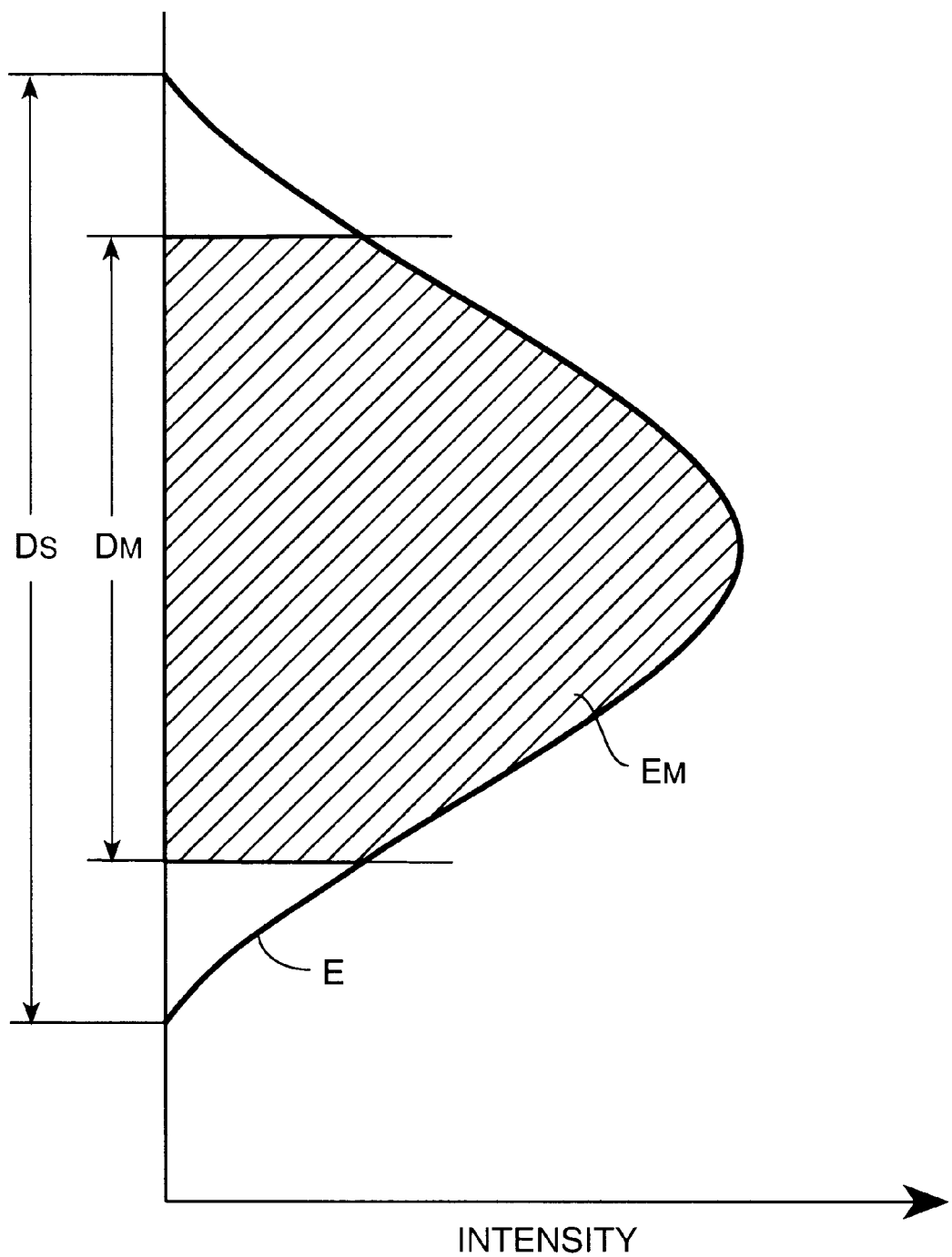
FIG._3

SOLID-STATE LASER APPARATUS

BACKGROUND OF THE INVENTION

This invention relates to a solid-state laser apparatus for exciting a solid-state laser medium placed inside a resonator with a beam of pump light from an appropriate source and thereby causing a beam of laser light to be emitted from the resonator.

In order that the transverse mode of the laser beam generated by such an apparatus be a single transverse mode ($TEM_{00}$), it has been know to make the pump light incident such that its transverse (pumping) mode coincides with the resonator mode of the solid-state laser medium or is included in the resonator mode. It is not a simple matter, however, to focus the pump light such that all of its pumping modes will be incident within the resonator mode in the solid-state laser medium because a complicated optical system will be required for the purpose. A particularly complicated optical system will be necessary if a semiconductor laser element is used as the source of pump light for the solid-state laser apparatus because the transverse mode of laser light from a semiconductor laser element is an elongated ellipse either because the stripe of active layer of a semiconductor laser element for emitting laser light is about $1\mu m$ in thickness while its width is about $100\ \mu m$ or due to astigmatism. Thus, a complicated optical system using a complicated lens such as an anamorphic prism pair or a cylindrical lens or a large number of lenses is required in order to change this shape into a true circle and to focus it within an area with a smaller diameter than that of the resonator mode. In order to obtain a high-power emission of solid-state laser light, the width of the stripe of the active layer of the semiconductor laser element must be increased with respect to its thickness, but this will make the transverse mode of the emitted laser light much flatter, and an even more complicated optical system will be necessary. If a complicated optical system is incorporated, not only the size of the solid-state laser apparatus itself but also the energy loss of the pump light will become large, making it economically disadvantageous.

In the case of a quasi-three-level laser system, furthermore, there is the big problem of reabsorption, or the absorption by the laser medium of the fluorescent light generated by spontaneous emission when the electrons excited by the pump light drop to lower energy levels, as well as the laser light which has just come to be emitted. Unless the pump light remains incident on the resonator mode in the solid-state laser medium, the reabsorbed energy is converted into heat, thereby raising the threshold for the laser light emission.

SUMMARY OF THE INVENTION

It is therefore an object of this invention in view of the problems described above to provide a solid-state laser apparatus with a simple structure capable of emitting laser light in a single transverse mode.

A solid-state laser apparatus embodying this invention, with which the above and other objects can be accomplished, may be characterized as comprising a solid-state laser medium inside a resonator, a pump light source such as a semiconductor laser apparatus which generates pump light, and an optical system for focusing the pump light on the solid-state medium such that its distribution is not only inside but also at least in part outside the resonator mode in the solid-state laser medium, say, over more than 50% of the total length of the solid-state laser medium.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1A is a schematic side view of a solid-state laser apparatus embodying this invention, and FIG. 1B is its schematic plan view;

FIG. 2A is a schematic front view of the solid-state laser medium of the apparatus of FIGS. 1A and 1B and FIG. 2B is its schematic side view for explaining the focusing of the pump light; and FIG. 3 is a graph showing the intensity distribution of the pump light on the end surface of the solid-state laser medium on the incident side.

DETAILED DESCRIPTION OF THE INVENTION

The invention is described next by way of an example with reference to the drawings. FIGS. 1A and 1B show a solid-state laser apparatus comprising a semiconductor laser element 11 used as a source of pump light, an optical system 12 for focusing the laser light emitted from this semiconductor laser element 11 serving as the pump light, and a resonator 13 for exciting a cylindrically formed solid-state laser medium 13a by the pump light focused by the optical system 12 to emit laser light. In the resonator 13, the solid-state laser medium 13a is disposed on the optical axis of the optical system 12 such that the pump light focused by the optical system 12 will irradiate the solid-state laser medium 13a. The resonator 13 further includes a mirror 13b disposed also on the optical axis of the optical system 12 and separated from the solid-state laser medium 13a by a specified distance. This may be a Fabry-Pérot resonator for resonating laser light of the resonant frequency between the reflective surface of the mirror 13b and the end surface 14 of the solid-state laser medium 13a. Thus, the distance between the end surface 14 of the solid-state laser medium 13a on which the pump light is made incident and the reflective surface of the mirror 13b is set equal to the resonator length. The resonator mode (resonant transverse mode) of the resonator 13 is determined by the resonator length and the characteristics of the solid-state laser medium 13a.

The laser light emitted from the semiconductor laser element 11 is made incident on the solid-state laser medium 13a of the resonator 13 through the optical system 12. The optical system 12 includes a first lens 12a and a second lens 12b both disposed on the optical axis of the laser light emitted from the semiconductor laser element 11. The laser light from the semiconductor laser element 11 has a transverse mode having the shape of a longitudinally elongated ellipse, and the first lens 12a serves to focus it on the second lens 12b while suppressing the angle of expansion of the laser light. The second lens 12b serves to focus the incident laser light, made convergent by the first lens 12a and having a elliptically shaped transverse mode, on the solid-state laser medium 13a inside the resonator 13 such that the transverse mode will have an elliptical shape.

As shown in FIG. 2A, the optical system 12 serves to focus the pump light such that not only will its elliptical distribution (excitation mode) S be made incident inside the resonator mode M of the solid-state laser medium 13a but at least a portion of it will irradiate outside the resonator mode M on the end surface 14 on the incident side of the solid-state laser medium 13a. In other words, the laser light serving as the pump light incident on the solid-state laser medium 13a serves to excite not only the interior of the resonator mode M but also a portion outside the resonator mode M.

A large fraction of the incident pump light is absorbed inside the half volume of the solid-state laser medium 13a on the side of its end surface 14 on the incident side. The length of the solid-state laser medium 13a is normally selected to be about equal to the inverse of its coefficient of absorption. If the coefficient of absorption of the medium is α and its length is made equal to $1/\alpha$, the total absorption by this medium will be $1-\exp(-\alpha/\alpha)=1-\exp(-1)=63\%$, while the portion absorbed in the half volume on the incident side of the pump light will be $1-\exp(\alpha/2\alpha)=1-\exp(-0.5)=39\%$ which is about 62% of the total absorption rate. If the length of the medium is increased in order to improve the absorption efficiency, the absorption in the half volume on the incident side becomes fractionally greater. If the length of the medium is doubled to $2/\alpha$, for example, the total rate of absorption becomes about 86% while the absorption into the half volume on the incident side becomes about 63%, which is as large as about 73% of the total rate of absorption.

The far-field intensity pattern of the transverse mode of the laser light from the semiconductor laser element 11 is nearly a gaussian distribution. Thus, since the diameter $D_M$ of the resonator mode in the solid-state laser medium 13a is 80% of the diameter $D_s$ of the pump light distribution S, as shown in FIG. 3, the usable energy $E_M$ for pumping on the end surface 14 is about 74% of the total energy E. If the excitation is caused in other than the resonator mode, however, there arises the possibility of exciting high transverse modes. In order to avoid such a possibility, it has been known to set a pin hole of an optimum diameter inside the resonator to generate a loss in higher modes other than the single transverse mode and to thereby forcibly generate a single transverse mode. By this method, however, the loss inside the resonator becomes large, increasing the threshold value of the laser emission and adversely affecting the efficiency of laser light generation.

In the present invention, this problem has been taken into consideration, and the first lens 12a and the second lens 12b are adjusted by considering that the intensity distribution of the pump light is nearly gaussian. According to this invention, the intensity of the pump light outside the resonator mode is kept below the threshold value for the excitation of higher transverse modes such that the energy loss due to reabsorption inside the laser medium is suppressed and a laser light beam with a single transverse mode can be obtained.

Thus, although the pump light distribution S may become larger than the resonator mode M on the end surface 14 of the solid-state laser medium 13a, excitation by the portion of the pump light irraditing outside the resonator mode M has hardly any effect on the excitation of the transverse mode in the laser light emitted from the resonator 13. In summary, a laser light with a single transverse mode with higher transverse modes suppressed can be emitted from the resonator 13.

Moreover, since the pump light according to this invention is not focused onto a very small fraction inside the resonator mode M (or since the pump light distribution S is not such that M>>S) on the end surface 14 of the solid-state laser element 13a, the thermal lens effect and the double refraction effect, which may be caused by the concentration of the pump light over a very small area, can be suppressed.

If the length of the solid-state laser element 13a is smaller than the inverse of its coefficient of absorption, the present invention teaches adjusting and optimizing the pumping intensity and the pumping light distribution such that the pumping intensity for excitation outside the resonator mode will be lower than the threshold for the excitation of higher transverse modes and an emission in a single transverse mode can be obtained. If the crystalline length of the solid-state laser medium 13a is significantly greater than the inverse of the medium's coefficient of absorption, the absorption by the medium takes place mostly in its front half volume on the incident side such that the emission in the single transverse mode is hardly affected.

The invention simply requires that the pumping light distribution S is large enough for exciting outside the resonator mode M inside the solid-state laser medium 13a over more than 50% of the length of the solid-state laser medium.

In summary, although the optical system 12 according to this invention is of a simple structure, having only the first lens 12a and the second lens 12a, the pump light can excite all over the resonator mode M of the solid-state laser medium 13a and to emit a laser light with a single transverse mode. The structure of the optical system 12 can be simple because there is no need to focus the elliptical transverse mode of the light from the semiconductor laser element 11 in a truly circular shape or inside the resonator mode M in the solid-state laser medium 13a. Such an optical system may be formed not necessarily by using two lenses but may comprise only one lens, although such an example is not separately illustrated. Use may equally well made of non-spherical lenses, spherical lenses or rod lenses.

Although the invention was described above with reference to only one example, this example is not intended to limit the scope of the invention. Many modifications and variations are possible within the scope of the invention. For example, the source of pump light need not be a single semiconductor laser element as shown above at 11. A polarization beam splitter or the like may be used to make beams of light from a plurality of semiconductor laser elements incident on the semi-conductor laser medium 13a. Instead of a semiconductor laser element, use may be made of a gas laser apparatus. Moreover, the kind of the solid-state laser medium 13a is not intended to limit the scope of the invention. All kinds of solid-state laser medium can be used for the purpose of this invention. As for the resonator 13, many other kinds of resonators can be used, besides the Fabry-Pérot resonator, such as the ring resonator and the Z-type resonators. In summary, the solid-state laser apparatus of this invention is characterized wherein the excitation mode of the pump light, or the pump light distribution, is controlled such that excitation takes place not only inside the resonator mode of the solid-state laser medium but also outside and hence that a laser beam with a single transverse mode can be generated from the resonator although the optical system of a simple structure is used.

What is claimed is:

1. A solid-state laser apparatus comprising:
    a resonator defining a resonator mode;
    a solid-state laser medium inside said resonator;
    a pump light source which generates pump light; and
    optical means for causing pump light distribution of said pump light to make incidence not only inside but also at least in part outside said resonator mode in said solid-state laser medium.

2. The solid-state laser apparatus of claim 1 wherein said optical means includes a first lens which serves to suppress angular expansion of said pump light and a second lens for focusing light from said first lens on said solid-state laser medium.

3. The solid-state laser apparatus of claim 1 wherein said pump-light source comprises a semiconductor laser apparatus.

4. The solid-state laser apparatus of claim 1 wherein said solid-state laser medium has a total length and said pump light excites outside said resonator mode over more than 50% of the total length of said solid-state laser medium.

5. The solid-state laser apparatus of claim 1 wherein said optical means serves to cause laser light with a single transverse mode emitted from said resonator.

6. The solid-state laser apparatus of claim 2 wherein said optical means serves to cause laser light with a single transverse mode emitted from said resonator.

7. The solid-state laser apparatus of claim 3 wherein said optical means serves to cause laser light with a single transverse mode emitted from said resonator.

8. The solid-state laser apparatus of claim 4 wherein said optical means serves to cause laser light with a single transverse mode emitted from said resonator.

* * * * *